Oct. 29, 1929.  J. BIJUR  1,734,027
FLOW CONTROL FITTING
Original Filed Aug. 9, 1922
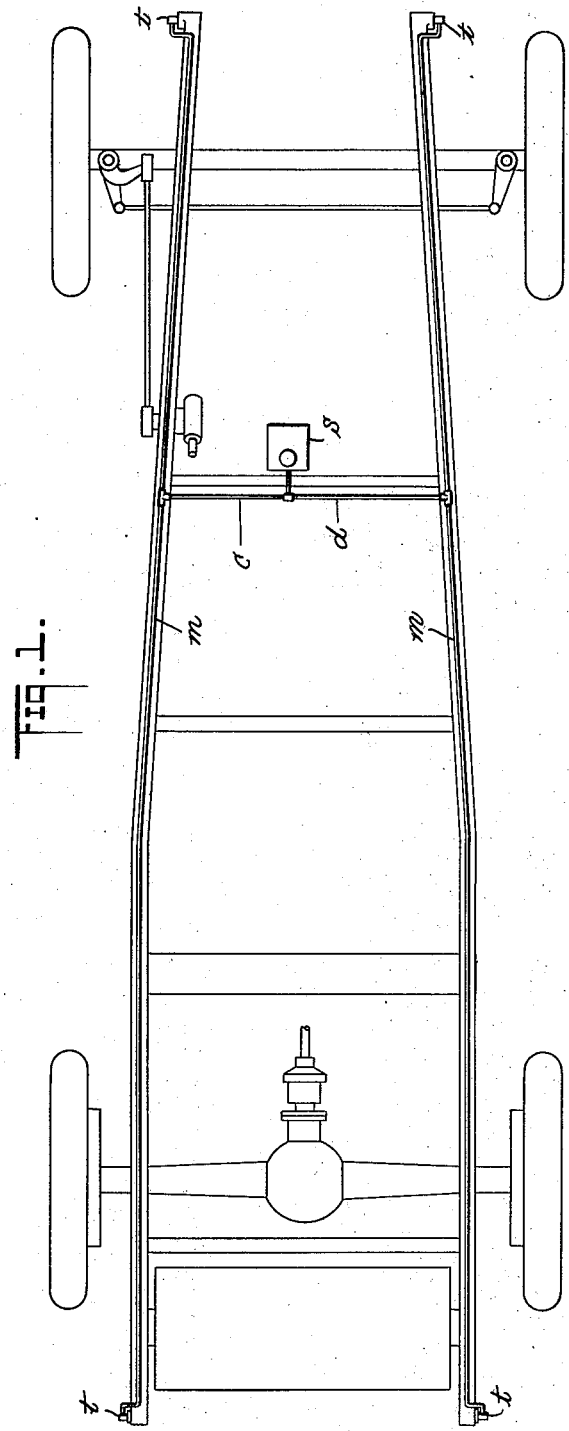
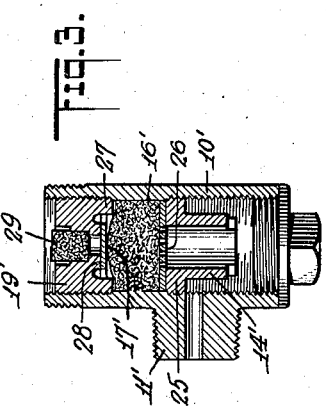
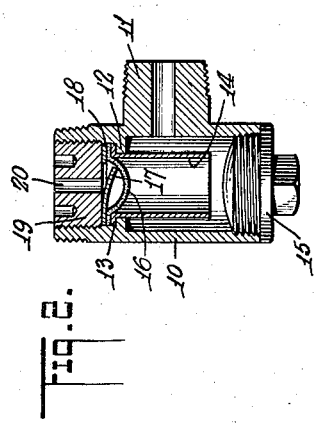
INVENTOR
Joseph Bijur
BY
his ATTORNEYS.

Patented Oct. 29, 1929

1,734,027

UNITED STATES PATENT OFFICE

JOSEPH BIJUR, OF NEW YORK, N. Y., ASSIGNOR TO AUTO RESEARCH CORPORATION, A CORPORATION OF DELAWARE

FLOW-CONTROL FITTING

Original application filed August 9, 1922, Serial No. 580,668. Divided and this application filed June 5, 1928. Serial No. 282,960.

My present invention relates primarily to chassis lubrication and is more especially concerned with flow control devices of the general type disclosed in my issued Patent No. 1,632,772 of June 14, 1927, and known as drip plugs.

While the drip plugs of my present invention are of general application to various distributing systems of the generic type disclosed in my issued patent, they have particular utility in the specific type of such systems where it becomes desirable or important to construct the leak preventing drip plug check valves in such manner as to avoid the counter pressure of even a weak check valve spring.

According to the present invention, I employ instead of a spring-seated check valve as disclosed in by issued patent, a loose or free floating valve so light as to open under little pressure. The movement of such valve, away from its seat is limited by appropriate stop means, so as to assure the return and seating thereof due to the slight tension of lubricant tending to leak out elsewhere in the system, thereby inhibiting such leakage.

For satisfactory operation of the valves of the character set forth, it is important to exclude dirt therefrom, not only after the drip plug is installed, but throughout the prior handling thereof, before installation. The entry of dirt through the inlet end of the drip plug is prevented by a strainer thereat. The valve is preferably between said strainer and the flow restriction, the latter excluding dirt from the outlet end of the drip plug. In this construction, the valve is thus also completely enclosed and protected from mechanical injury.

According to another feature, the flow restriction of the drip plug is so related to the loose valve, that viscous oil is maintained at and adjacent the latter, which would facilitate valve closure under the slight suction thereon. The volume of oil adjacent the valve would, moreover, prevent the entry of air and leak of oil from the system, inasmuch as substantially all of such oil would have to be drawn past the valve before such failure of operation could occur.

While the flow restriction may be of any of the numerous alternative constructions shown in my parent application, Serial No. 580,668, filed August 9th, 1922, of which this is a division, I have illustratively shown two embodiments, one comprising a restriction or obstruction in the form of a diaphragm, and the other a plug of compressed felt. In both embodiments, the restriction illustratively serves the additional function of a back or limiting stop for the floating valve, which may be either a flap valve held at its periphery, or a loose disk. I have also shown an oil trap interposed between the restriction and the bearing nipple of the fitting, which serves as an additional safeguard to prevent the entry of air.

Claims specific to the embodiment of Fig 2 are presented in my divisional application, Serial No. 398158 filed October 8, 1929.

In the accompanying drawings in which are shown one or more of various possible embodiments of the several features of the invention, Fig. 1 is a diagrammatic view of a vehicle showing the piping system and location of typical bearings thereof, Fig. 2 is a view in longitudinal cross-section showing one embodiment of drip plug construction, and Fig. 3 is a view similar to Fig. 2 showing another embodiment of drip plug.

In Fig. 1 of the drawings is shown diagrammatically the general layout of the chassis of an automobile, equipped with a lubricant supply unit S, illustratively at the dashboard, serving to force lubricant into the head of a distributing system which includes headers c and d, which communicate at their ends with two mains m, that extend the length of the channel frames and feed various bearings, at or near which the drip plug terminals t are applied. Bridging conduits (not shown) are provided, leading to distributing piping on the axles, and supplying similar drip plugs at or near the bearings thereof (not shown).

In Fig. 2 I have shown a drip plug embodying a vertical tube 10 open at both ends and having an integral lateral nipple 11 by which it is affixed to the bearing, preferably in vertical position. The tube has an integral ledge or shoulder 12 therein near the upper end thereof, upon which rests the outturned flange 13 of a sleeve 14 extending downward therefrom, affording substantial clearance thereabout with respect to the inner wall of the fitting and extending substantially below the bore of the nipple 11. The lower end of the fitting is closed by a plug 15.

Upon the flange 12 rests the periphery of a bowl-shaped membrane 16 of parchment, calf-skin or a similar high resistance porous material, said membrane being bowed outward into the tube and affording a high resistance to flow. At the concave side of the membrane is disposed a floating valve illustratively a flap valve which comprises a disk 18 of a limber material, such as leather or of thin spring steel, having a struck-out tongue 17 adapted to flex out of the plane of the disk into the cavity determined by the bowl-shaped membrane. An inlet plug 19 axially perforated at 20 affords a seat at its inner end for the flap valve 17 and serves to clamp the periphery 18 of the flap valve, the periphery of the membrane 16 and flange 13 of the sleeve 14 securely against the flange 12 and thus to complete the assembly.

In Fig. 3 is shown another drip plug construction, in which the restriction is illustratively shown as a compacted plug 16' of felt, cotton or the like, disposed directly within the bore of a cartridge 10' similar to that of Fig. 2. The restriction plug is compressed in place within the cartridge between an inlet plug 19' and a nut 25 provided with an integral depending sleeve 14' extending downward below the bore of nipple 11' to form an oil seal as in the embodiment of Fig. 2. A perforated disk 26 is interposed between the felt restriction mass 16' and the nut 25, through which pressure is evenly applied to the restriction mass, forcing it against a projecting flange 27 on the inlet plug 19', the felt mass bulging under the pressure into the depression within the flange 27, to press a disk non-return valve 17' therein against its seat 28 within the counterbored end of the inlet plug 19'. Preferably the outer face of the inlet plug 19' is provided with a strainer plug 29 of felt, serving to intercept any solid particles carried with the oil, which might otherwise become lodged at and impair the seating effectiveness of the valve or ultimately clog the felt plug restriction.

Obviously, the strainer 29 may be provided in identical relation and for the same purpose in a corresponding socket in the inlet plug 19 of the embodiment of Fig. 2.

In the operation of the system of Fig. 1 equipped with drip plugs t such as those of Fig. 2 or Fig. 3, lubricant will readily unseat the floating check or non-return valves 17, 17', to allow emission to the bearings at the rates imposed by the corresponding restriction members 16, 16'.

After pressure on the pipe line has been discontinued, the tension of lubricant tending to leak from the piping exerts suction to close the light non-return valves 17, 17', of those drip plugs governing the flow to bearings at higher level, thereby excluding air from the system at that region and thus functioning to inhibit emission or leak as long as the pressure source is out of operation.

The restrictions 16, 16', being beyond the corresponding non-return valves, they retain oil in engagement therewith after the system has ceased feeding, so that the suction due to the lubricant in the pipe branches leading to bearings at lower level has first to pull such oil through the crevice between the valves 17, 17', and the corresponding seats,— a slow operation even with a defective valve,—before air can go through. Oil helps seal the loose floating valve and in fact, insures its being pulled to its seat. Being viscous, oil resists being drawn through the crack by the very light force available.

Since a valve of leather or other limber material might droop so far away from the seat as to be urged away from, rather than towards its seat by the suction flow described, it is important to provide means to limit the valve deflection. This is accomplished in the specific embodiment shown by the engagement of the valves with the restriction members 16, 16'.

The valve being disposed within the drip plug, between the strainer 29 at one end, and the restriction member 16, 16' at the other, is not only protected from mechanical injury, but is guarded from derangement by the entry of dirt thereto, either through the inlet or the outlet end of the drip plug. Thus, the drip plug may be handled in usual course prior to installation in the lubricating system, without danger of a particle of dirt settling between the valve and its seat. In service, the strainer keeps any dirt carried with the oil, away from the valve and the restriction hinders the entry of dirt from a bearing to the valve.

In the specific constructions shown, the restriction or obstruction 16, 16', thus performs no less than five useful functions. In addition to governing the rate of emission under a given pressure, the restriction element also protects the valve from mechanical injury, it excludes foreign particles from the valve, it affords a dam to maintain a body of oil adjacent the valve to assist valve closure and exclude air, and it limits the deflection of the valve from its seat

I claim:

1. A drip plug comprising a fitting piece having one part adapted for application to a bearing and another part adapted for coupling of a pipe terminal thereto, said fitting having instrumentalities therein including a strainer near the inlet, a control obstruction and a loose valve interposed between said strainer and said obstruction said valve being so light as to close by return flow of lubricant.

2. A drip plug comprising a fitting having one part adapted for application at a bearing and another part for coupling a feed pipe terminal thereto, a loose check valve within said drip plug said valve being so light as to close by return flow of lubricant, and means protecting said valve, said means including a strainer at the inlet side of said drip plug contiguous to said valve and a valve protective obstruction at the outlet side of said valve.

3. A drip plug comprising a pipe fitting element having a control obstruction and a loose valve therein, said valve being so light as to close by return flow of lubricant, and means for retaining a body of lubricant adjacent said valve at the outlet side thereof, in order to hinder the entry of air to the valve.

4. A drip plug comprising a pipe fitting element having a loose light disk valve therein, and means for retaining a body of lubricant adjacent said valve at the outlet side thereof, thereby to hinder the entry of air to the valve, said latter means affording a pressure absorbing control for retarding emission when pressure is applied to the drip plug.

5. A drip plug comprising a fitting having a nipple adapted to be applied at a bearing, and having flow restriction means therein, a valve seat in said fitting at the side of said restriction from which lubricant is supplied, a disk valve loosely lodged between said seat and said restriction, said restriction substantially preventing the draining of lubricant from the space adjacent said valve, thereby to afford a body of lubricant for facilitating the seating of the valve.

6. A drip plug comprising a fitting having a part for coupling a feed pipe terminal thereto, a loose check valve within said drip plug so light as to close by return flow of lubricant, and means protecting said valve, said means including a strainer at the inlet side of said drip plug and a flow emitting restriction at the outlet side of said valve.

7. A drip plug comprising a fitting having a nipple adapted for application to a bearing and a part adapted for coupling of a feed pipe terminal thereto, a loose check valve within said fitting, so light as to close by return flow of lubricant, a strainer guarding said valve from the entry of dirt through the inlet end, and a flow controlling restriction member at the outlet side of said valve, serving also to hinder passage of dirt to the valve from the outlet.

8. A drip plug comprising a fitting, having a flow controlling obstruction therein, a flat non-return valve in one end of said fitting, a metal element plugged in said fitting, means near the inner end thereof to afford a seat for said valve and to limit lateral shifting of said valve, and means limiting the movement of said valve from its seat and affording an oil exit.

9. A drip plug comprising a composite fitting including two elements threaded together to form a unitary assembly and including a flow control obstruction, said fitting presenting a valve seat at the inner end of one of said elements, a suction seated valve near said seat, means in said fitting to limit lateral shifting of said valve, and means to limit the displacement of said valve from its seat, and to afford an oil exit.

10. A drip plug comprising a fitting piece having a valve seat therein, a loose check valve associated therewith, and flow restriction means in said fitting, contiguous to said valve and limiting the movement of the latter from said seat.

11. A drip plug including a fitting having a flow obstruction member and a floating check valve therein, adapted to close under slight suction, and means in said fitting limiting the deflection of said valve from its seat.

12. A drip plug comprising a composite fitting including two elements threaded together to form a unitary assembly, and a suction-seated flat valve piece retained at its periphery near one end of one of said elements, and a flow obstruction in the other element serving also to protect said valve.

13. A drip plug comprising a pipe fitting having a part adapted to be applied to a bearing, and a part adapted for application of a pipe terminal thereto, said fitting having a flow restriction and a suction seated check valve therein, and a closure piece retaining said valve in place within said fitting.

14. In a drip plug a fitting including a part adapted for application of a pipe terminal thereto, said fitting including a valve seat with its face directed away from said inlet terminal, a floating valve and a backing member both having a circular periphery, said fitting including means to retain the peripheries of said valve and said backing member near said seat, said backing member affording a limited path of deflection for the opening movement of said valve.

15. A drip plug comprising a fitting having a nipple for application at a bearing, a flow restriction in said fitting, a metal member threaded into a socket at the inlet end of said fitting, a light valve loosely lodged in a corresponding depression in the end of said member, means limiting the movement of said valve from its seat, said restriction being near said valve, thereby to afford a body of lubricant adjacent said valve, for facilitating the seating of the latter by slow reverse flow of oil.

16. A drip plug comprising a fitting having a nipple for application at a bearing, flow restriction means in said fitting, a metal element threaded into a socket at the inlet of said fitting, a disk valve loosely lodged in a corresponding counterbore in the inner end of said element, means limiting the movement of said valve, said valve being so light as to close by return flow of lubricant, and a strainer carried in said threaded element to protect said valve and said restriction from derangement by solid particles carried with the lubricant.

17. A drip plug comprising a fitting provided with a nipple for application to a bearing and a flow restriction in said fitting, a metal element threaded into a socket at the inlet end of said fitting, a floating check valve loosely lodged in a corresponding depression at the inner end of said element, means limiting the movement of said valve, said valve being so light as to become seated against the end of said element by return flow of lubricant.

18. In a drip plug restriction fitting, a non-return valve construction comprising a metal element counterbored at the inner end thereof, to afford a valve seat, a disk valve loosely lodged in said counterbored portion, and holding means contacting the periphery of said counterbored end and having a part projecting centrally to limit the movement of said valve with respect to its seat.

19. In a drip plug a fitting having a nipple for application at a bearing, a complementary part having a threaded connection thereto, said complementary part having a short axial bore therethrough, the inner end of said complementary part constituting a valve seat, a strainer at the inlet end of said bore, a loose valve coacting with said seat, means limiting lateral shifting of said valve and means limiting the deflection of the central part of said valve away from said seat.

20. A drip plug including an outlet part adapted to be applied to a bearing and a part to which a pipe terminal is adapted to be affixed, an obstruction in said fitting, of controlling resistance to flow and an oil trap member, between said restriction and said outlet part.

21. As an element in a lubricating system, in combination, a pipe fitting having a flow obstruction across the bore thereof and a liquid seal structure between said restriction and the outlet from said fitting, trapping lubricant to seal the fitting against entry of air.

22. A drip plug comprising a fitting having a mounting nipple, adapted to be applied to a bearing and a part to which a pipe terminal is adapted to be fixed, an obstruction in said fitting of substantially fixed invariant resistance to flow, said fitting including an insert affording an oil trap between the restriction and the mounting nipple.

23. A drip plug comprising a fitting having a compressible plug of fibrous material therein, serving as a flow restriction, means threaded into said fitting from opposite ends thereof, and exerting compression against the opposite ends of said restriction, and a loose flow-return valve in the drip plug at the inlet end of said fitting.

24. As an article of manufacture, a drip plug including a flow obstruction and a loose valve imposing substantially no resistance to emission under pressure on the system and adapted to close under return impulse, to inhibit reverse flow.

Signed at New York city in the county of New York and State of New York this 25th day of May, A. D. 1928.

JOSEPH BIJUR.